United States Patent
Morioka et al.

(10) Patent No.: US 7,460,666 B2
(45) Date of Patent: Dec. 2, 2008

(54) COMBINATIONAL CIRCUIT, ENCRYPTION CIRCUIT, METHOD FOR CONSTRUCTING THE SAME AND PROGRAM

(75) Inventors: Sumio Morioka, Yamato (JP); Akashi Satoh, Yamato (JP); Gang Zhang, Yanato (JP)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 10/349,519

(22) Filed: Jan. 22, 2003

(65) Prior Publication Data

US 2003/0198343 A1 Oct. 23, 2003

(30) Foreign Application Priority Data

Jan. 28, 2002 (JP) ............................. 2002-017959

(51) Int. Cl.
*H04L 9/14* (2006.01)
(52) U.S. Cl. .......................................... 380/37; 380/29
(58) Field of Classification Search .................. 380/37, 380/38
See application file for complete search history.

(56) References Cited

U.S. PATENT DOCUMENTS

| | | | | |
|---|---|---|---|---|
| 5,917,728 | A * | 6/1999 | Ueda ............................. | 716/18 |
| 6,026,222 | A * | 2/2000 | Gupta et al. ..................... | 716/5 |
| 6,380,778 | B2 * | 4/2002 | Uehara et al. ................ | 327/175 |
| 6,587,990 | B1 * | 7/2003 | Andreev et al. ................. | 716/2 |
| 2001/0024502 | A1 * | 9/2001 | Ohkuma et al. ............... | 380/46 |
| 2003/0068036 | A1 * | 4/2003 | Macchetti et al. ............. | 380/29 |
| 2003/0068038 | A1 * | 4/2003 | Hanounik ..................... | 380/37 |

FOREIGN PATENT DOCUMENTS

| | | |
|---|---|---|
| JP | 04-103213 | 4/1992 |
| JP | 09-097281 | 4/1997 |
| JP | 10-254920 | 9/1998 |
| WO | WO 00/88843 | 11/2000 |

OTHER PUBLICATIONS $0(\log_2 m)$ Iterative Algorithm for Multiplicatice Inversion in $GF(2m)$: Sumio Morioka and Yasunao Katayama: IBM research, Tokyo Research Lab. 1623-14 Shimotsuruma, Yamato, Kanagawa 242-8502 Japan.
A Complact Rijndael Hardware Architecture with S-Box Optimization: A. Satoh, S. Morioka, K. Takano, and S. Munetoh: IBM Research Tokyo Research Lab., IBM Japan Ltd., 1623-14, Shimotsuruma, Yamato-shi, Kanagawa 242-8502 Japan.
Transactions on computers, vol. C-35, No. 8, Aug. 1986. Graph-Based Algorithms for Boolean Function Manipulation: Randal E. Bryant, Member IEEE.

* cited by examiner

*Primary Examiner*—Matthew B Smithers
(74) *Attorney, Agent, or Firm*—Ido Tuchman; Lisa M. Yamonaco

(57) ABSTRACT

To provide a high-speed combinational circuit including an S-Box and a method for creating an RO-BDD that defines a configuration of the combinational circuit. The combinational circuit includes a number of independent selector groups for each generating an output bit separately, the number corresponding to number of the output bits, and a driver chain for supplying a primary input to each of the selector groups, in which each of the selector groups includes a plurality of selectors connected to each other to form a number of stages, the number of stages being equal to or less than number of bits of the primary input, and a select signal for the selectors in each stage is driven by one primary input.

20 Claims, 5 Drawing Sheets

COMBINATIONAL CIRCUIT, ENCRYPTION CIRCUIT, METHOD FOR CONSTRUCTING THE SAME AND PROGRAM

FIELD OF THE INVENTION

The present invention relates to construction of a combinational circuit. In particular, it relates to a construction of a combinational circuit used in an encryption circuit.

BACKGROUND ART

Encryption is essential in information communications via a computer network, in particular, in the VPN (Virtual Private Network) communications in which a public network mimics a dedicated line. And as the communication speed becomes higher, the required speed of the encryption becomes higher.

Common key cryptography, which is an encryption technique predominantly used in the computer network now, includes DES (Data Encryption Standard), AES (Advanced Encryption Standard) and Camellia. All of logic circuits (encryption circuits) for implementing these encryption techniques include a nonlinear converter unit, referred to as an S-Box, whose processing speed substantially affects the processing speed of the logic circuits themselves.

Now, an S-Box calculation in the common key cryptography and a method for constructing a circuit therefor will be described. Herein, the description is focused on the S-Box for the AES, for example.

The S-Box for the AES (i) applies on an 8-bit input multiplicative inversion in a GF ($2^8$) constituted by an irreducible polynomial $x^8+x^4+x^3+x+1$ and then (ii) applies on the result an Affine transformation expressed by the following formula 1 to output an 8-bit value.

$$\begin{pmatrix} y0 \\ y1 \\ y2 \\ y3 \\ y4 \\ y5 \\ y6 \\ y7 \end{pmatrix} = \begin{pmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{pmatrix} \begin{pmatrix} x0 \\ x1 \\ x2 \\ x3 \\ x4 \\ x5 \\ x6 \\ x7 \end{pmatrix} + \begin{pmatrix} 1 \\ 1 \\ 0 \\ 0 \\ 0 \\ 1 \\ 1 \\ 0 \end{pmatrix} \quad \text{[Formula 1]}$$

"S-Box$^{-1}$" indicates an inversion of this calculation.

To implement an S-Box circuit, there are two methods: (1) a GF inversion circuit and an Affine transformation circuit are constructed separately according to the definition described above and then connected in series to each other; and (2) the circuit is directly derived from relations between inputs and outputs (a truth table).

In the case of method (1), there may be adopted a calculation using the Fermat's little theorem $P^{-1}=P^{254}$ (for the GF($2^8$)), a calculation using the extended Euclid's algorithm, or a conclusion to an inversion on a composite field. However, all of these are not suitable for high-speed implementation and have a circuit delay several times longer than that in method (2). For details of these techniques, see S. Morioka and Y. Katayama. "O(log$_2$m) Iterative Algorithm for Multiplicative Inversion in GF ($2^m$)," IEEE Intl. Symp. On Info. Theory (ISIT2000), pp. 449, 2000, and A. Satoh, S. Morioka, K. Takano and S. Munetoh, "A Compact Rijndael Hardware Architecture with S-Box Optimization," ASIACRYPT2001, 2001.

On the other hand, in the case of method (2), there are known methods of constructing a logical formula in the form of product-sum, sum-product, or various Reed-Muller expressions, or method of various function expansions.

Next, a general logic synthesis algorithm for the combinational circuit will be described. As a logic construction method using a function expansion, a method using RO-BDD (Reduced Ordered Binary Decision Diagrams) is known. The RO-BDD is one of expression forms of logical formulas, and involves representing a process of Shannon expansion of a logical function in a certain sequence of variables as a binary decision diagram without closed circuit and removing any redundant node. Each node in the RO-BDD can be replaced with a 2:1 selector (MUX: multiplexer) to implement a circuit of the RO-BDD. Such a logic construction using the RO-BDD is described in detail in the following reference, R. E. Bryant; Graph-Based Algorithms for Boolean Function Manipulation, IEEE transactions on computers, Vol. C-35, No. 8, 1986.

The graph configuration of the RO-BDD corresponds to the resulting circuit configuration (relation among the connected selectors) substantially in one-to-one relationship. Therefore, determination of the configuration of the RO-BDD defines the circuit configuration. For a given logical function, there is more than one RO-BDD. There is design flexibility in sharing of nodes or sequence of variables.

FIG. 5 shows an arrangement of an S-Box for the AES based on the RO-BDD created according to a conventional logic synthesis algorithm. In FIG. 5, connections between selectors constituting the combinational circuit and between stages of the selectors are omitted appropriately.

As shown in FIG. 5, the S-Box combinational circuit based on the RO-BDD created according to the conventional logic synthesis algorithm has the following significant characteristics, which are not found in common logical functions.

Characteristic 1: on the output side of the circuit, few selectors are shared among outputs or selector groups for the same output. Sharing of selectors occurs in the first and second stages on the side of the input of the circuit. That is, from the output to the input, the number of selectors increases exponentially, 1*8, 2*8, 4*8, 8*8, . . . , and for substantially all the selectors, the fan-out of the output thereof is one. Then, the last two stages on the side of the input, the fan-out of the selector output is rapidly increased (about 30). To the contrary, many common logical functions, in which many selectors are shared in stages near the output, don't have such a tree structure as shown in FIG. 5. In addition, many nodes can be typically shared among outputs.

Characteristic 2: overall configuration of the coupled selectors is substantially independent of the sequence of input bits (which input bit drives which selector) and meets the above characteristic (1) for any sequence of bits. To the contrary, in many common logical functions, varying the sequence of input bits substantially changes the overall configuration of the circuit.

As described above, in the past, the RO-BDD has been used to define the circuit configuration and design the combinational circuit. The fastest S-Box is a circuit obtained by automatic logic synthesis from a truth table of the S-Box. However, the S-Box involves an input/output definition that resembles the random number table, and thus, it is incompatible with general logical synthesis methods. Therefore, in the application for encryption described above, a sufficient speed could not be attained.

In other words, since the RO-BDD created according to the conventional logic synthesis algorithm has the above-described characteristics 1, 2, if the combinational circuit, such as the S-Box, is designed in such a manner that the RO-BDD is used to define the circuit configuration, the following two problems arise in designing a high-speed circuit.

(1) Fan-out of select signals and output data signals of selectors on the input side of the circuit is increased (in FIG. 5, for example, the second stage from the input includes 149 selectors, driving the select signals therefor is quite heavy. The selector output of each selector in the first stage from the input is needed to drive nearly 30 input signals for the selectors in the second stage, which is also quite heavy).

(2) The circuit comprises selectors connected to each other in series to form multiple stages, and thus, the time for signals to pass therethrough is long.

SUMMARY OF THE INVENTION

Thus, an aspect of the present invention is to solve the above-described problems, provide a high-speed combinational circuit, such as the S-Box, and provide a method for creating an RO-BDD that defines a circuit configuration of such a combinational circuit.

In order to attain the aspect, this invention is implemented as a combinational circuit comprising a plurality of selectors as described below. A driver chain is provided for each input bit and includes buffers or inverters chained to each other. The driver chains are connected to the selector groups in different sequences from the input side through the buffers or inverters to the output side, and each supply the select signals to the selector stages of the selector groups.

Another example of a combinational circuit according to this invention comprises a $2^n$:1 selector that replaces a predetermined number n of stages of 2:1 selectors on the output side in 2:1 selectors connected to each other to form a number of stages, the number being equal to or less than number of bits of a primary input, on a condition that, at least in the n stages of 2:1 selectors, no 2:1 selector is shared among groups of 2:1 selectors for generating a plurality of output bits, and 2:1 selectors remaining after the replacement with the $2^n$:1 selector.

Another aspect of this invention for attaining the above-described aspect is a method and apparatus for constructing a combinational circuit using an RO-BDD as described below. That is, the method for constructing a combinational circuit comprises the steps of creating a number of RO-BDDs that share no node therebetween and have different sequences of variables, the number corresponding to number of output bits, replacing each node in each of the RO-BDDS with a selector, and providing a driver chain for generating a control signal for each of the selectors and connecting the selectors and the driver chains to each other by associating the stages of the selectors based on the RO-BDD with the driver chains.

BRIEF DESCRIPTION OF THE DRAWINGS

These and other objects, features, and advantages of the present invention will become apparent upon further consideration of the following detailed description of the invention when read in conjunction with the drawing figures, in which.

DESCRIPTION OF SYMBOLS

Figure 1:
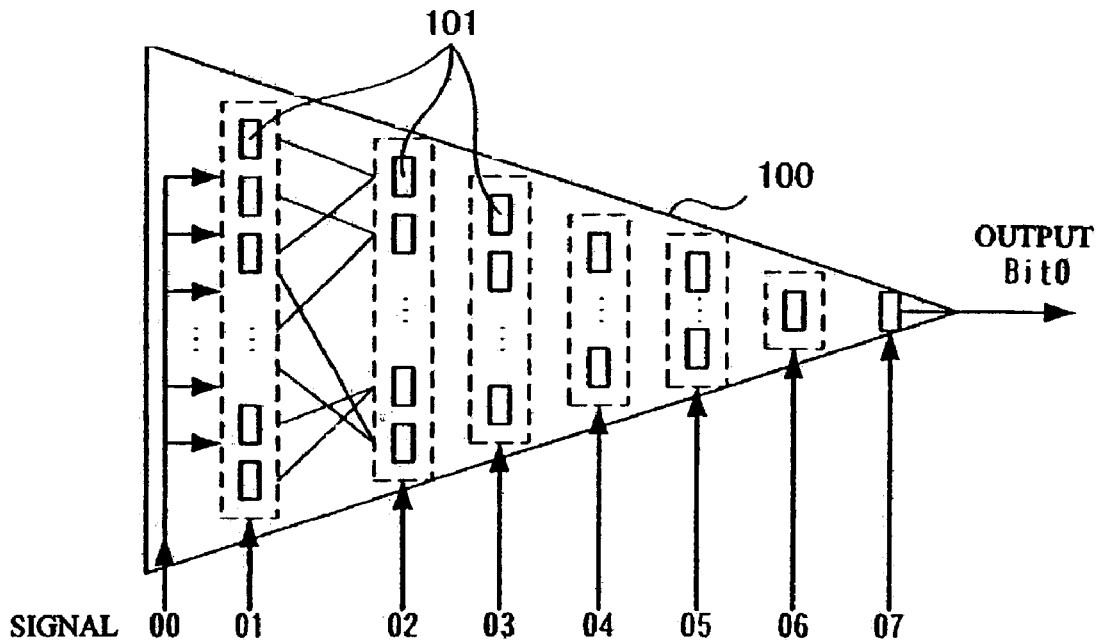
FIG. 1 shows a construction of an S-Box combinational circuit according to an example embodiment of the present invention.
Figure 1:
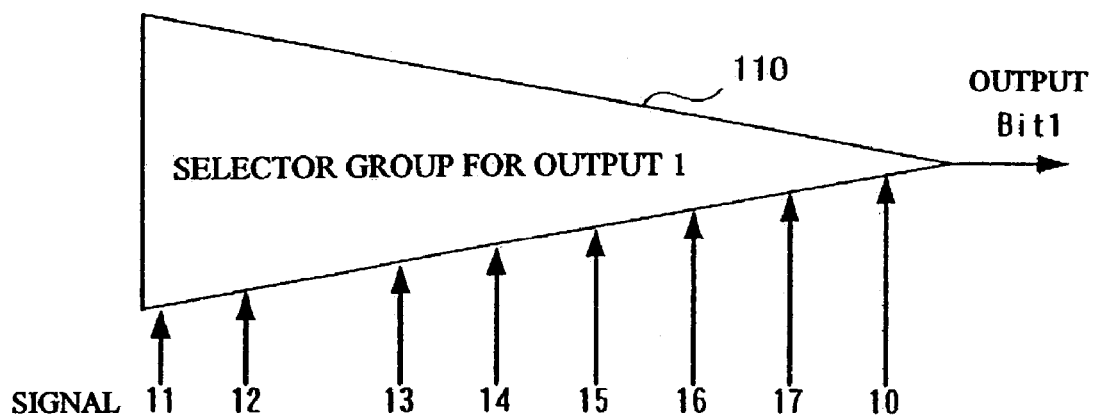
Figure 1:
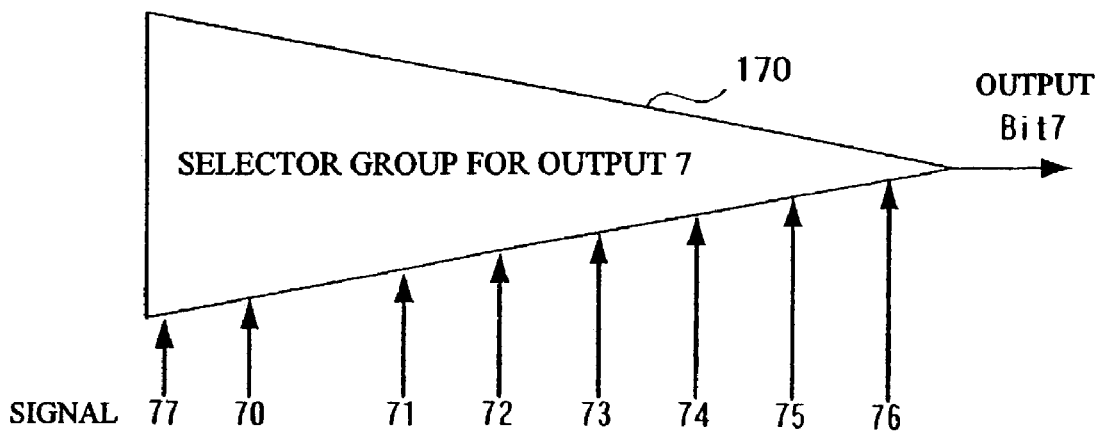

100, 110, 170 . . . Selector group
101 . . . Selector (2:1 selector)
210 . . . Selector ($2^n$:1 selector)
211 . . . Selection circuit
212 . . . Decoder
300, 310, 370 . . . Driver chain

DESCRIPTION OF THE INVENTION

The present invention provides a high-speed combinational circuit, such as the S-Box, and a method for creating an RO-BDD that defines a circuit configuration of such a combinational circuit. This invention is implemented as a combinational circuit comprising a plurality of selectors as described below. That is, the combinational circuit comprises a number of independent selector groups for each generating an output bit separately, the number corresponding to number of the output bits, and a driver for supplying a primary input to each of the selector groups, in which each of the selector groups comprises a plurality of selectors connected to each other to form a number of stages, the number of stages being equal to or less than number of bits of the primary input, and a select signal for the selectors in each stage is driven by one the primary input.

Specifically, the driver is a driver chain provided for each input bit and including buffers or inverters chained to each other. The driver chains are connected to the selector groups in different sequences from the input side through the buffers or inverters to the output side, and each supply the select signals to the selector stages of the selector groups. Thus, the primary input for controlling the select signal for the i-th selector (total number of stages $\geq i \geq 1$) differs among the selector groups, and the sequence of the selector signals input to each stage differs among the selector groups.

Another combinational circuit according to this invention comprises a $2^n$:1 selector that replaces a predetermined number n of stages of 2:1 selectors on the output side in 2:1 selectors connected to each other to form a number of stages, the number being equal to or less than number of bits of a primary input, on a condition that, at least in the n stages of 2:1 selectors, no 2:1 selector is shared among groups of 2:1 selectors for generating a plurality of output bits, and 2:1 selectors remaining after the replacement with the $2^n$:1 selector. The $2^n$:1 selector comprises a generator circuit for generating a select signal for determining which is selected among from $2^n$ inputs, and a selection circuit for selecting one of the $2^n$ inputs based on the select signal generated in the generator circuit.

Furthermore, in the above-described combinational circuit comprising a number of independent selector groups for each generating an output bit, the number corresponding to number of the output bits, the 2:1 selectors constituting the selector group can be replaced with a $2^n$:1 selector.

The invention further provides methods and apparatus for constructing a combinational circuit using an RO-BDD as described below. That is, the method for constructing a combinational circuit comprises the steps of creating a number of RO-BDDs that share no node therebetween and have different sequences of variables, the number corresponding to number of output bits, replacing each node in each of the RO-BDDS with a selector, and providing a driver chain for generating a control signal for each of the selectors and connecting the selectors and the driver chains to each other by associating the stages of the selectors based on the RO-BDD with the driver chains.

Another example method for constructing a combinational circuit according to this invention comprises the steps of creating an RO-BDD having a complete tree structure with number of nodes in a predetermined number n of stages on the output side corresponding to number of output bits, replacing the n stages of nodes in the RO-BDD with a $2^n$:1 selector comprising a generator circuit for generating a select signal for determining which is selected among from $2^n$ inputs and a selection circuit for selecting one of the $2^n$ inputs based on the select signal, and replacing the other nodes with 2:1 selectors.

Furthermore, this invention is implemented as a program for controlling a computer to logically synthesize a circuit structure of a combinational circuit as described below. The program causes the computer to execute a step of splitting a logical formula or truth table of the combinational circuit to be processed for each output bit to generate logical formulas or truth tables each for 1-bit output, a step of determining, for each of the logical formula or truth table for 1-bit output, a sequence of variables of an RO-BDD while avoiding overlap with other logical formula or truth table, constructing a shared-RO-BDD for the logical formula or truth table according to the determined sequence of variables and mapping each node therein to a 2:1 selector, and a step of providing a driver chain for generating a control signal for each of the 2:1 selectors and connecting the driver chain to the control signal of the RO-BDD.

More specifically, when mapping to selectors in the RO-BDD, the program causes the computer to execute the steps of transforming a predetermined number n of stages on the root side in the shared-RO-BDD into a unshared-RO-BDD, mapping n stages of nodes transformed into the unshared-RO-BDD to a $2^n$:1 selector, and mapping the other nodes to 2:1 selectors.

The above-described program can be distributed by storing it in a magnetic disk, optical disk, semiconductor memory or other recording media, or distributed via a network. Furthermore, this invention can also be implemented as an encryption circuit comprising the combinational circuit described as the S-Box.

Now, this invention will be described in detail with reference to an embodiment shown in the accompanying drawings. This embodiment is to attain the following two goals in a combinational circuit, such as an S-Box.

1. To reduce the fan-out of control signals or output signals of selector groups on the side of a primary input of the circuit.
2. To reduce a delay of a signal passing through a part of the circuit on the side of the primary output compared to a circuit comprising selectors simply connected to each other to form multiple stages.

FIG. 1 shows an arrangement of an S-Box combinational circuit according to this embodiment, in which the above-described goals are attained.

Referring to FIG. 1, the combinational circuit comprises a plurality of selectors 101 connected to form m or less stages (m indicates the number of bits of a primary input), in which one primary input drives a select signal for selectors constituting one predetermined stage. That is, it is a circuit provided by replacing each node of an RO-BDD of the S-Box with a 2:1 selector. For example, selectors in a first stage are all driven by an input bit 0, and selectors in a second stage are all driven by an input bit 1 (ditto for the subsequent stages). In other words, this circuit is provided by replacing each node of the RO-BDD derived from a truth table with a selector and connecting the selectors to each other according to branches of the RO-BDD.

In FIG. 1, connections between selectors 101 in each selector group 100 and between stages of the selectors 101 are omitted appropriately. In the combinational circuit shown in FIG. 1, separate selector groups 100-170 generate their respective output bits and share no selector. That is, the selector groups 100-170 are independent of each other. The primary input for controlling the select signal for the i-th selector (total number of stages $\geq i \geq 1$) differs among the selector groups 100-170.

For example, in the example shown in FIG. 1, in the circuit that generates the output bit 0 (selector group 100), the selectors in the first stage are controlled by the input bit 0 (signal 00 in FIG. 1), and the selectors in the second stage are controlled by the input bit 1 (signal 01) (similarly, the subsequent stages are controlled by signals 02, 03, . . . ) In the circuit that generates the output bit 1 (selector group 110), the selectors in the first stage are controlled by the input bit 1 (signal 11) rather than the input bit 0, the selectors in the second stage are controlled by the input bit 2 (signal 12), and so on. In this way, the sequence of the select signals is in rotation among the stages.

Here, it is essential only that load distribution is assured by the difference in the sequence of the select signals (input bits) among the selector groups 100-170, and of course, the sequence is not limited to the rotation shown in FIG. 1. The combinational circuit according to this embodiment further comprises drivers for supplying primary inputs to the selector groups 100-170 shown in FIG. 1. In this embodiment, a drive chain comprising chained buffers or inverters is used.

Figure 2:
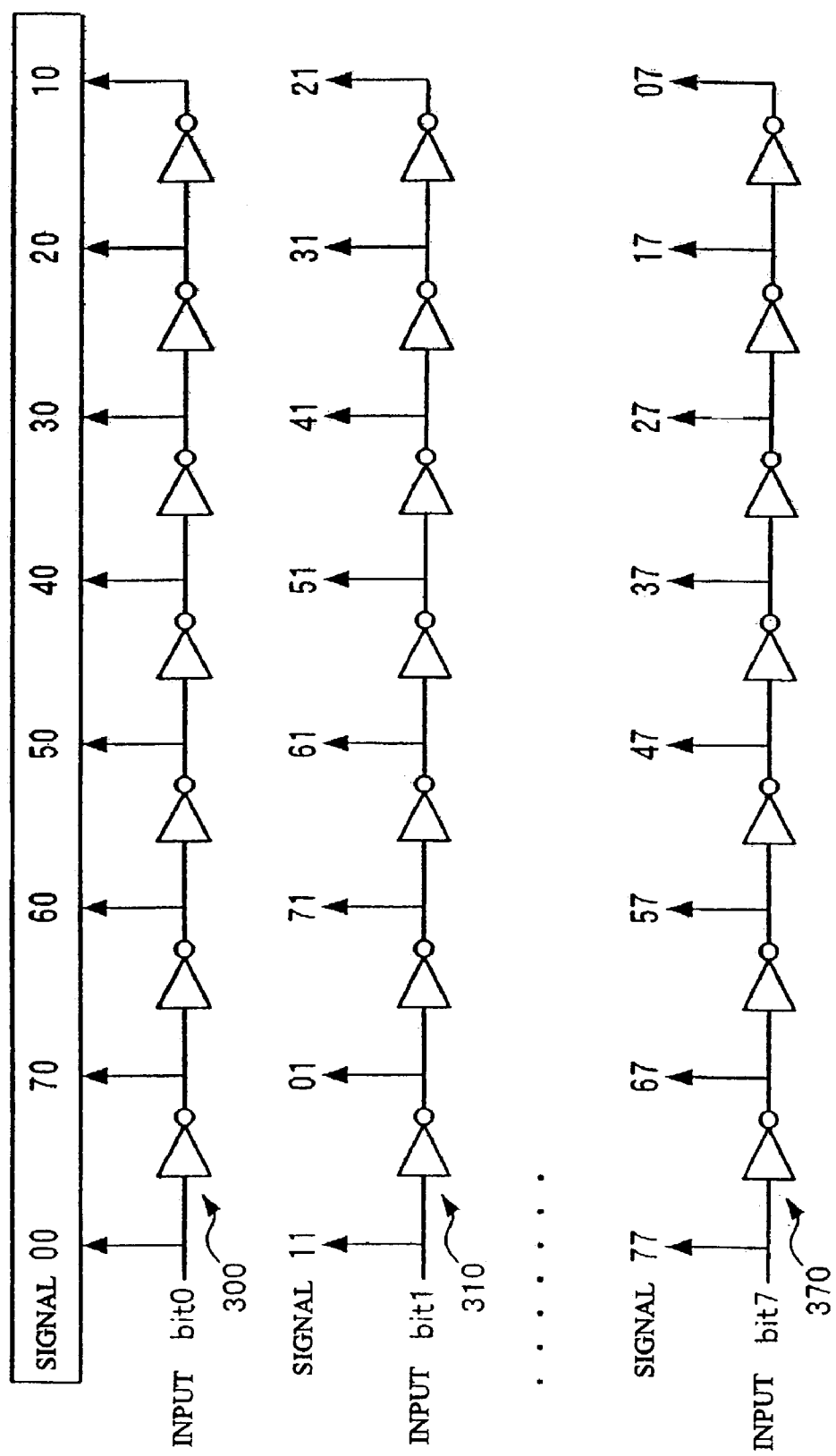
FIG. 2 illustrates an arrangement of a driver chain used in the embodiment of FIG. 1, and a distribution of input select signals by the driver chain.

FIG. 2 shows an arrangement of the driver chain and a distribution of the input select signals by the driver chain. Referring to FIG. 2, each of driver chains 300-370 comprises chained buffers or inverters and is provided for each input bit (0-7). The arrangement of each of the driver chains 300-370 is associated with the selector stages in the selector groups 100-170, and then, the control signals for driving the selectors in each stage is supplied to the stage. Here, the driver chains 300-370 and the selector groups 300-370 are connected to each other so that the control signal for the input-side selectors in the selector groups 100-170 is provided from the input side of the chain, and the control signal for the output-side selectors is provided from the output side of the chain. Furthermore, as described above, they are connected to each other so that the sequence of the select signals (input bits) differs among the selector groups 100-170.

For example, the driver chain 300 for supplying the input bit 0 (see FIG. 2) is connected, at the first node from the input, to the selector group 100 shown in FIG. 1 and supplies the signal 00 thereto. Then, toward the output thereof through the buffers or inverters, it is successively connected at every node to the selector groups 170, 160, . . . , 110, and supplies thereto the signals 70, 60, . . . , 10, respectively. Similarly, the other driver chains 310-370 are connected to the selector groups 100-170 in different sequences. Thus, the sequence of the select signals for the selector stages differs among the selector groups 100-170, and the load of supplying the select signals can be distributed.

Figure 5:
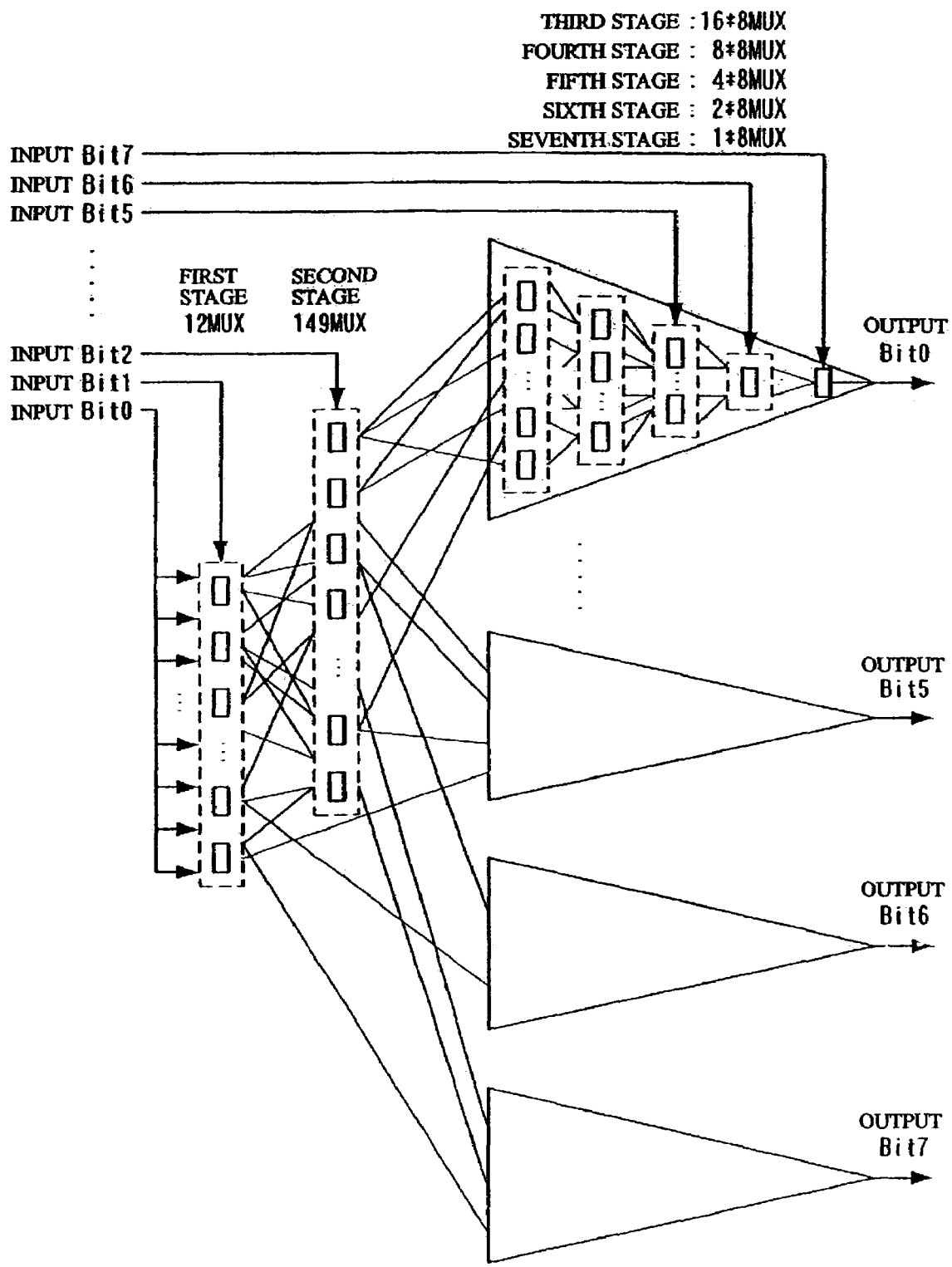
FIG. 5 shows an arrangement of the S-Box combinational circuit based on the RO-BDD created according to a conventional logic synthesis algorithm.

Such an arrangement reduces the fan-out of the select signals or fan-out of the output signals from the selectors. For example, in each of the selector groups 100-170 shown in FIG. 1, the second stage includes about 30 selectors. Thus, compared to the case where it includes 149 selectors as shown in FIG. 5, driving the select signal is substantially lightened. In addition, the fan-out of the selectors in the preceding stage is reduced to 2-5. Furthermore, the driver chain allows the fan-out of each select signal to be reduced (by 2-5). Thus, a high-speed circuit can be provided.

The driver chains 300-370 shown in FIG. 2 can be configured so that positive logic control signals and negative logic control signals appear alternately from the input to the output, and selectors controlled by the negative logic signals can be configured to interchange two data signal inputs thereof. In some cases, such an arrangement can increase further the speed of the combinational circuit. This is because inverters can typically provide a higher speed than buffers for CMOS devices.

Figure 3:
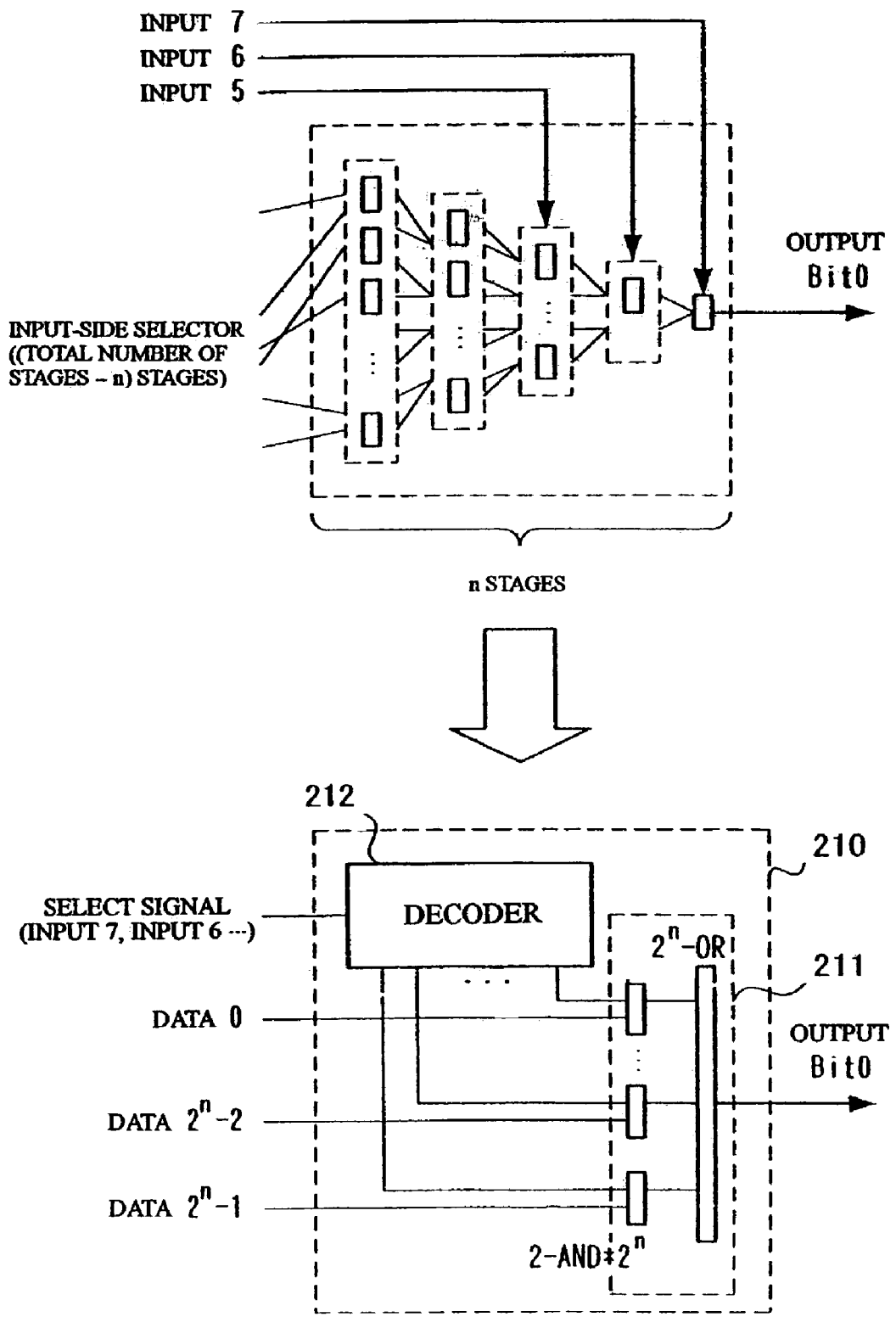
FIG. 3 shows an arrangement of a selector group associated with each of output bits shown in FIG. 1.

FIG. 3 shows an arrangement of a selector group associated with each output bit shown in FIG. 1. Referring to FIG. 3, in the combinational circuit according to this embodiment, each selector groups is configured as follows. In FIG. 3, connections between selectors 101 and between stages of the selectors 101 are omitted appropriately.

Each selector group is a circuit in which selectors in n stages from the output thereof are constituted by one $2^n$:1 selector 210 (having $2^n$ two-input AND gates and one $2^n$-input OR gate) rather than n stages of 2:1 selectors connected to each other. Specifically, if any selector is shared in the n stages from the output, the sharing is cancelled, and then all the selectors therein are replaced with the $2^n$:1 selector 210. The $2^n$:1 selector 210 comprises a selection circuit 211 having the two-input AND gates and the $2^n$-input OR gate coupled to each other and an n-bit binary to $2^n$-bit one-hot decoder 212 (simply denoted as decoder in FIG. 3) for changing the primary inputs in the n stages into an input to the selection circuit 211. The decoder 212 is a circuit for generating a select signal that determines which is selected among from the $2^n$ inputs. Besides, in order to cancel sharing of a selector, the shared selector can be duplicated.

The value n can be arbitrarily set. However, to increase the speed in the most effective manner possible, it can be determined as follows. If the number of selectors in the n-th stage from the output is $2^{(n-1)}$ or a value close thereto, and a delay of the n-bit binary to $2^n$-bit one-hot decoder 212 is equal to or less than a delay from the primary input to the (n+1)-th selector stage from the output, the speed of the circuit can be increased by replacing the 2:1 selectors in the n stages with the selection circuit 211 having the 2-input AND gates and the $2^n$-input OR gate. Therefore, the value n is 4 or 5 in the case of the AES, for example.

According to such an arrangement, the speed of the selector part on the side of the output is increased compared with the case where the selector part is constituted by n stages of 2:1 selectors simply connected to each other. As for the remaining selectors, they may be constituted by the 2:1 selectors as usual, or if possible, k stages of selectors may be constituted by a $2^k$:1 selector, the value k being determined as in the case of the value n described above. In addition, if each selector group has a circuit arrangement in which each selector is replaced with a logical NOT output selector and negative logic output selectors and positive logic output selectors are disposed alternately from the input to the output, the speed of the combinational circuit can be further increased in some cases. This is because negative logic output selectors can often provide a higher speed than positive logic output selectors for CMOS devices or the like.

The arrangement of the combinational circuit described above may include both or either of the distribution of the input select signals by the driver chains 300-370 shown in FIG. 2 and the replacement of the n stages of selectors in the selector groups shown in FIG. 3. That is, the selector group shown in FIG. 1 may be constituted by only conventional 2:1 selectors. Alternatively, even if the selector groups 100-170 are not provided for the output bits respectively, at least when the n stages of selectors on the output side constitute a group associated with an output bit and the groups thus formed share no selector, the n stages of selectors may be replaced with the $2^n$:1 selector 210. Even if the circuit arrangement includes either one of them, the circuit can have a higher speed than a combinational circuit using the RO-BDD created based on a conventional logic synthesis algorithm. However, if the circuit arrangement includes both of them, the speed of the circuit can be further increased.

Now, to construct the S-Box combinational circuit, the logic synthesis algorithm for creating the RO-BDD for defining the circuit arrangement will be described. To create the RO-BDD, the algorithm for generating a graph of the RO-BDD from the truth table or logical formula of the combinational circuit is essential. However, the algorithm itself is well-known, and therefore, the detailed description thereof is omitted herein. The algorithm for automatically synthesizing the S-Box combinational circuit architecture using the graph generating algorithm will be described below.

Figure 4:
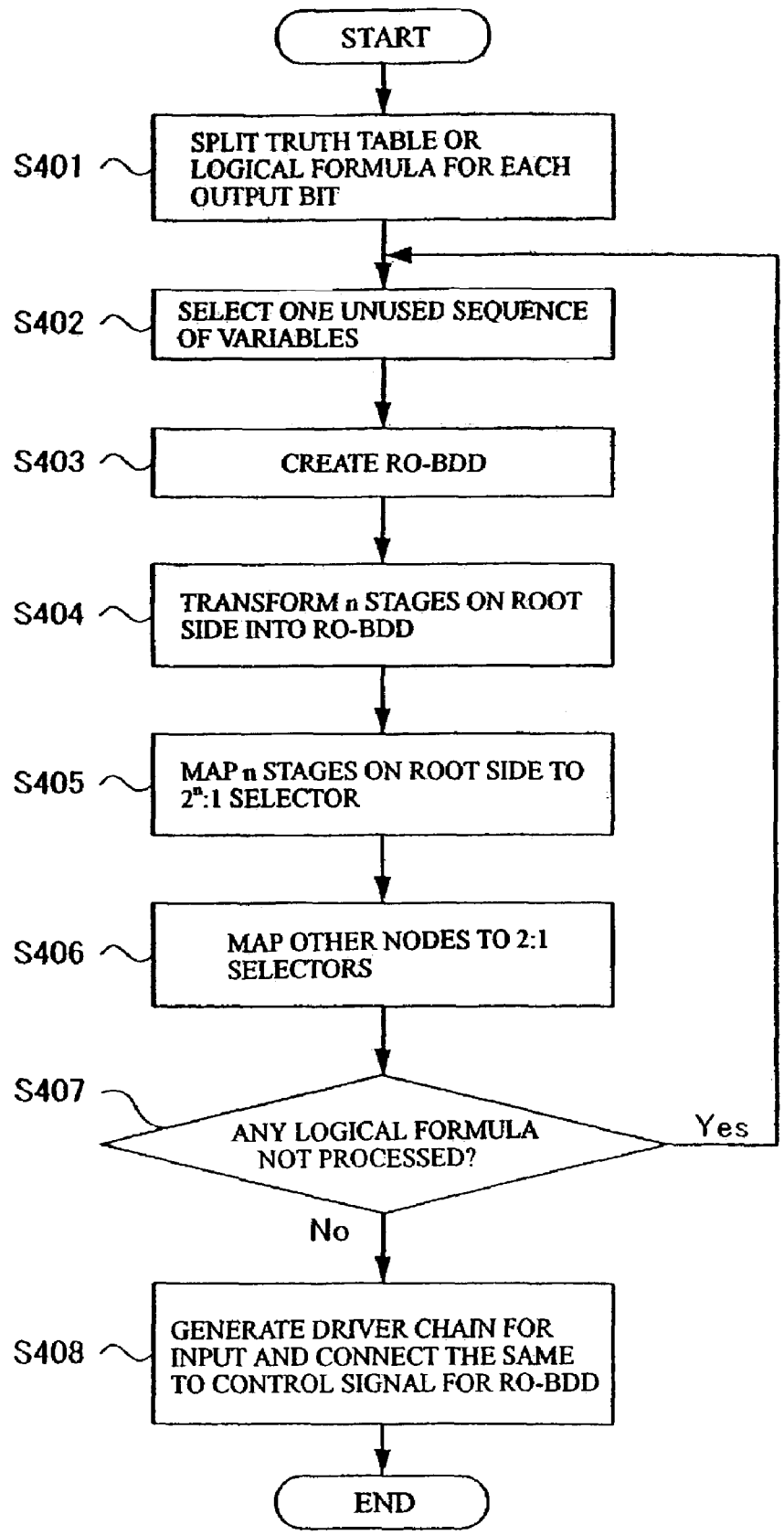
FIG. 4 is a flowchart for illustrating a logic synthesis algorithm for creating an RO-BDD according to the embodiment.

FIG. 4 is a flowchart for illustrating a logic synthesis algorithm for creating the RO-BDD according to this embodiment. The creation of the RO-BDD based on the logic synthesis algorithm may be implemented in a personal computer, work station or other computer apparatus. The computer apparatus comprises a CPU (Central Processing Unit) for various data processings and a memory for storing a program for controlling the CPU and various kinds of data.

The input of the logic synthesis algorithm is the truth table or logical formula of various kinds of S-Box. Any type of logical formula can be used. The output thereof is a logical formula associated with the circuit arrangement (relation among the connected selectors) described above. Therefore, the CPU reads the truth table or logical formula of the S-Box stored in the memory to be processed, generates a truth table or logical formula associated with the circuit arrangement described and stores the same in the memory. In the following description, the truth table and the logical formula are collectively referred to as a logical formula.

Referring to FIG. 4, the CPU reads a logical formula of the S-Box to be processed from the memory, and splits the logical formula for each output bit to generate logical formulas for 1-bit output (referred to as a unit logical formula hereinafter) (step 401). Then, the CPU successively performs a series of processings described below on each of the unit logical formulas generated in step 401.

Specifically, first, with respect to one unit logical formula to be processed, the sequence of variables of the RO-BDD is determined (step 402). The sequence of variables is different from those of the other unit logical formulas that have been already processed (that is, an unused sequence of variables is adopted). Then, according to the determined sequence, an RO-BDD in which a sharable node is shared (shared-RO-BDD) is generated for the unit logical formula (step 403). Then, n stages from the root side of the generated RO-BDD (shared-RO-BDD) are transformed into an RO-BDD in which any sharing of node is cancelled (unshared-RO-BDD) (step 404). The part of the unshared-RO-BDD constitutes a complete tree (complete binary tree). Then, the n stages of RO-BDD nodes on the root side are mapped to a $2^n$:1 selector (step 405), and each of the remaining RO-BDD nodes is mapped to a 2:1 selector (step 406).

Upon performing the processings of the steps 402 to 406 on the unit logical formulas for all bits, the CPU generates driver chains one for each primary input and connects the driver chains to the control signals for the RO-BDD (steps 407, 408). A signal for driving a node (selector) on the input side (leaf side) of the RO-BDD is provided from the input side of the chain, and a signal for driving the output side (root side) of the RO-BDD is provided from the output side of the chain.

In this way, the combinational circuit with the circuit arrangement shown in FIGS. 1 to 3 is constructed. Here, the processings of the steps 404 to 406 are for implementing the arrangement of each selector group shown in FIG. 3, and thus, are not necessary if each of the selector groups does not adopt the circuit arrangement shown in FIG. 3.

The circuit arrangement according to this embodiment is effective for combinational circuits in which the structure of the connected selectors (structure of the RO-BDD) is characterized in that:

on the output side of the circuit, few selectors are shared among the outputs or selector groups for the same output; and overall configuration of the coupled selectors is substantially independent of the sequence of the input bits and meets the above characteristic (1) for any sequence of bits. Typical examples thereof include various kinds of S-Box and other combinational circuits including a random numbers table.

As described above, according to this invention, the S-Box or the like can be implemented as a high-speed combinational circuit, and a advantageous method for creating the RO-BDD that defines a circuit arrangement of such a combinational circuit can be provided.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, that comprises all the features enabling the implementation of the methods described herein, and that—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture that comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements, timing indications and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A combinational circuit including a plurality of selectors, the combinational circuit comprising:

a number of independent selector groups, each selector group generating an output bit separately, the number of selector groups corresponding to the number of output bits; and a driver for supplying a primary input to each of said selector groups, wherein each of said selector groups comprises a plurality of selectors connected to each other to form a number of stages, the number of stages being equal to or less than a number of bits of said primary input, and a select signal for said selectors in each stage is driven by one said primary input.

2. The combinational circuit according to claim 1, wherein said driver is a driver chain provided for each input bit and including buffers or inverters chained to each other, and said driver chains are connected to said selector groups in different sequences from the input side through the buffers or inverters to the output side, and each supply the select signals to the selector stages of said selector groups.

3. The combinational circuit according to claim 1, wherein 2:1 selector in a predetermined number n of stages on the output side in each of said selector groups are replaced with a $2^n$:1 selector, and said $2^n$:1 selector comprises:

a generator circuit for generating a select signal for determining which of the primary inputs is selected among from $2^n$ inputs; and a selection circuit for selecting one of the $2^n$ inputs based on the select signal generated in said generator circuit.

4. A combinational circuit including a plurality of selectors, the combinational circuit comprising:

a $2^n$:1 selector that replaces a predetermined number n of stages of 2:1 selectors on the output side in 2:1 selectors connected to each other to form a number of stages, the number being equal to or less than a number of bits of a primary input, on a condition that, at least in the n stages of 2:1 selectors, no 2:1 selector is shared among groups of 2:1 selectors for generating a plurality of output bits; and 2:1 selectors remaining after the replacement with said $2^n$:1 selector, wherein said $2^n$:1 selector comprises:

a generator circuit for generating a select signal for determining which of the primary inputs is selected among from $2^n$ inputs; and a selection circuit for selecting one of the $2^n$ inputs based on the select signal generated in said generator circuit.

5. An encryption circuit including an S-Box, wherein a combinational circuit equivalent to said S-Box comprises:

a number of independent selector groups for each generating an output bit separately, the number corresponding to number of the output bits; and a driver for supplying a primary input to each of said selector groups, and each of said selector groups comprises a plurality of selectors connected to each other to form a number of stages, the number of stages being equal to or less than number of bits of said primary input, and a select signal for said selectors in each stage is driven by one said primary input.

6. The encryption circuit according to claim 5, wherein said driver is a driver chain provided for each input bit and including buffers or inverters chained to each other, and said driver chains are connected to said selector groups in different sequences from the input side through the buffers or inverters to the output side, and each supply the select signals to the selector stages of said selector groups.

7. The encryption circuit according to claim 5, wherein 2:1 selectors in a predetermined number n of stages on the output side in each of said selector groups are replaced with a $2^n$:1 selector, and said $2^n$:1 selector comprises:

a generator circuit for generating a select signal for determining which of the primary inputs is selected among from $2^n$ inputs; and a selection circuit for selecting one of the $2^n$ inputs based on the select signal generated in said generator circuit.

8. An encryption circuit including an S-Box, wherein a combinational circuit equivalent to said S-Box comprises:

a $2^n$:1 selector that replaces a predetermined number n of stages of 2:1 selectors on the output side in 2:1 selectors connected to each other to form a number of stages, the number being equal to or less than number of bits of a primary input, on a condition that, at least in the n stages of 2:1 selectors, no 2:1 selector is shared among groups of 2:1 selectors for generating a plurality off output bits; and 2:1 selectors remaining after the replacement with said $2^n$:1 selector, and said $2^n$:1 selector comprises:

a generator circuit for generating a select signal for determining which of the primary inputs is selected among from $2^n$ inputs; and a selection circuit for selecting one of the $2^n$ inputs based on the select signal generated in said generator circuit.

9. A method for constructing a combinational circuit using RO-BDD (Reduced Ordered Binary Decision Diagrams), the method comprising the steps of:

creating a number of RO-BDDs that share no node therebetween and have different sequences of variables, the number corresponding to number of output bits;

replacing each node in each of said RO-BDDS with a selector; and providing a driver chain for generating a control signal for each of said selectors and connecting said selectors and the driver chains to each other by associating the stages of said selectors based on said RO-BDD with the driver chains.

10. A method for constructing a combinational circuit using RO-BDD (Reduced Ordered Binary Decision Diagrams), the method comprising the steps of:

creating an RO-BDD having a complete tree structure with number of nodes in a predetermined number n of stages on the output side corresponding to number of output bits;

replacing said n stages of nodes in said RO-BDD with a $2^n$:1 selector comprising a generator circuit for generating a select signal for determining which input is selected among from $2^n$ inputs and a selection circuit for selecting one of the $2^n$ inputs based on the select signal; and replacing the other nodes with 2:1 selectors.

11. A program embodied in computer readable medium for controlling a computer to logically synthesize a circuit structure of a combinational circuit, wherein the program causes said computer to execute the processings of:

reading from a memory a logical formula or truth table of the combinational circuit to be processed and splitting the logical formula or truth table for each output bit to generate logical formulas or truth tables each for 1-bit output;

determining, for each of said logical formula or truth table for 1-bit output, a sequence of variables of an RO-BDD (Reduced Ordered Binary Decision Diagrams) while avoiding overlap with other logical formula or truth table, constructing a shared-RO-BDD for the logical formula or truth table according to the sequence of variables and mapping each node in the shared-RO-BDD to a 2:1 selector;

providing a driver chain for generating a control signal for each of said 2:1 selectors and connecting the driver chain to the control signal of said RO-BDD; and storing in said memory the logical formula or truth table for the combinational circuit for which selectors have been mapped and the driver chains have been set.

12. The program according to claim 11, wherein when mapping to selectors in said RO-BDD, the program causes said computer to execute the steps of:

transforming a predetermined number n of stages on the root side in said shared-RO-BDD into a unshared-RO-BDD;

mapping n stages of nodes transformed into said unshared-RO-BDD to a $2^n$:1 selector comprising a generator circuit for generating a select signal for determining which input is selected among from $2^n$ inputs and a selection circuit for selecting one of the $2^n$ inputs based on the select signal generated in said generator circuit; and mapping the other nodes to 2:1 selectors.

13. A recording medium having a program for controlling a computer to logically synthesize a circuit structure of a combinational circuit recorded therein in a computer-readable manner, wherein said program causes said computer to execute the steps of:

reading from a memory a logical formula or truth table of the combinational circuit to be processed and splitting the logical formula or truth table for each output bit to generate logical formulas or truth tables each for 1-bit output;

determining, for each of said logical formula or truth table for 1-bit output, a sequence of variables of an RO-BDD (Reduced Ordered Binary Decision Diagrams) while avoiding overlap with other logical formula or truth table, constructing a shared-RO-BDD for the logical formula or truth table according to the sequence of variables and mapping each node in the shared-RO-BDD to a 2:1 selector;

providing a driver chain for generating a control signal for each of said 2:1 selectors and connecting the driver chain to the control signal of said RO-BDD; and storing in said memory the logical formula or truth table for the combinational circuit for which selectors have been mapped and the driver chains have been set.

14. The recording medium according to claim 13, wherein when mapping to selectors in said RO-BDD, the program causes said computer to execute the steps of:

transforming a predetermined number n of stages on the root side in said shared-RO-BDD into a unshared-RO-BDD;

mapping n stages of nodes transformed into said unshared-RO-BDD to a 2n:1 selector comprising a generator circuit for generating a select signal for determining which input is selected among from 2n inputs and a selection circuit for selecting one of the 2n inputs based on the select signal generated in said generator circuit; and mapping the other nodes to 2:1 selectors.

15. An article of manufacture comprising a computer usable medium having computer readable program code means embodied therein for causing construction of a combinational circuit, the computer readable program code means in said article of manufacture comprising computer readable program code means for causing a computer to effect the steps of claim 9.

16. An article of manufacture comprising a computer usable medium having computer readable program code means embodied therein for causing construction of a combinational circuit, the computer readable program code means in said article of manufacture comprising computer readable program code means for causing a computer to effect the steps of claim 10.

17. A program storage device readable by machine, tangibly embodying a program of instructions executable by the machine to perform method steps for construction of a combinational circuit, said method steps comprising the steps of claim 9.

18. A method comprising:

constructing an encryption circuit including an S-Box, such that a combinational circuit equivalent to said S-Box comprises:

a number of independent selector groups for each generating an output bit separately, the number corresponding to number of the output bits; and a driver for supplying a primary input to each of said selector groups, and each of said selector groups comprises a plurality of selectors connected to each other to form a number of stages, the number of stages being equal to or less than number of bits of said primary input, and a select signal for said selectors in each stage is driven by one said primary input.

19. An article of manufacture comprising a computer usable medium having computer readable program code means embodied therein for causing construction of an encryption circuit, the computer readable program code means in said article of manufacture comprising computer readable program code means for causing a computer to effect the steps of claim 18.

20. A program storage device readable by machine, tangibly embodying a program of instructions executable by the machine to perform method steps for construction of an encryption circuit, said method steps comprising the steps of claim 18.

* * * * *